Aug. 25, 1953   E. V. BROWN   2,649,885
TIRE LUG
Filed Nov. 16, 1948   3 Sheets-Sheet 1
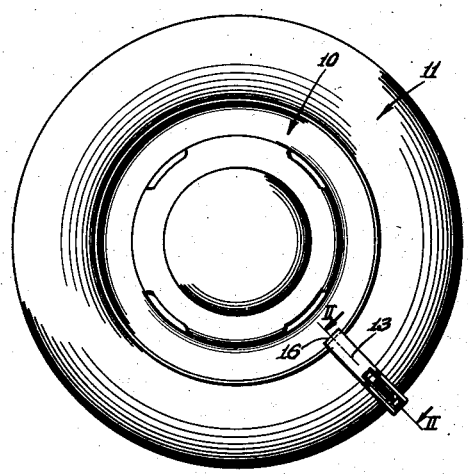
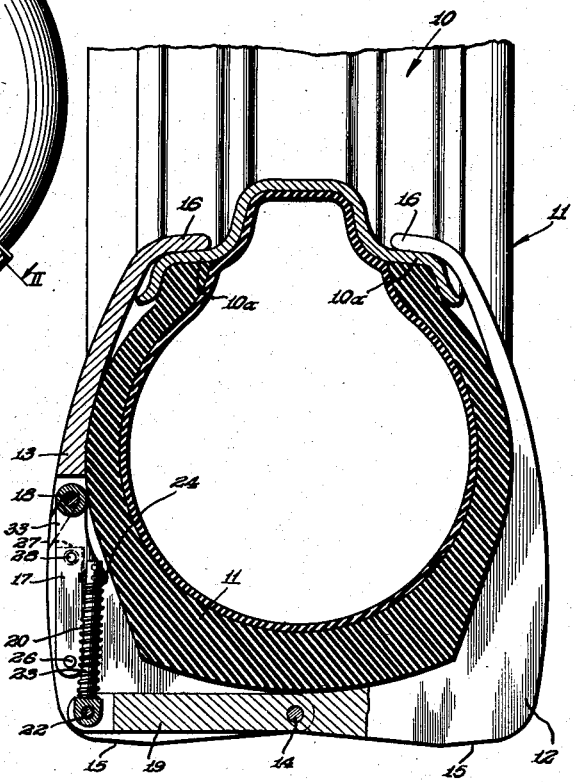
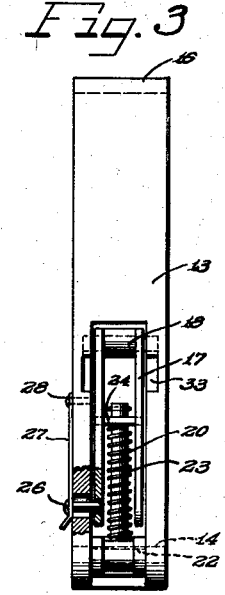
Inventor
Edmund V. Brown Aug. 25, 1953     E. V. BROWN     2,649,885
TIRE LUG
Filed Nov. 16, 1948     3 Sheets-Sheet 2
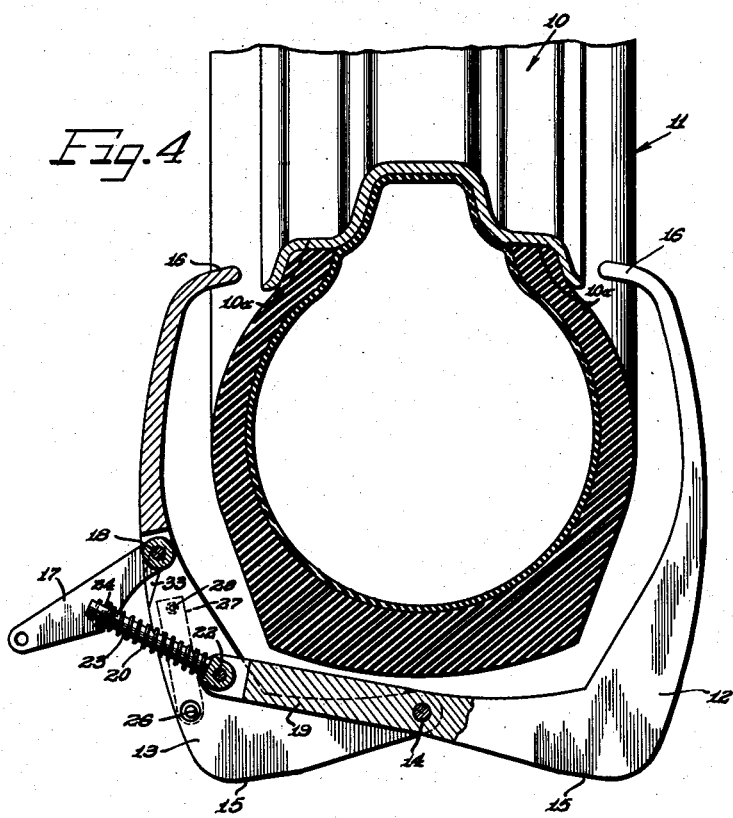
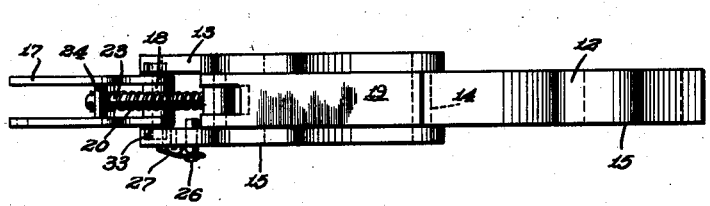
Inventor
Edmund V. Brown Aug. 25, 1953 — E. V. BROWN — 2,649,885
TIRE LUG
Filed Nov. 16, 1948 — 3 Sheets-Sheet 3
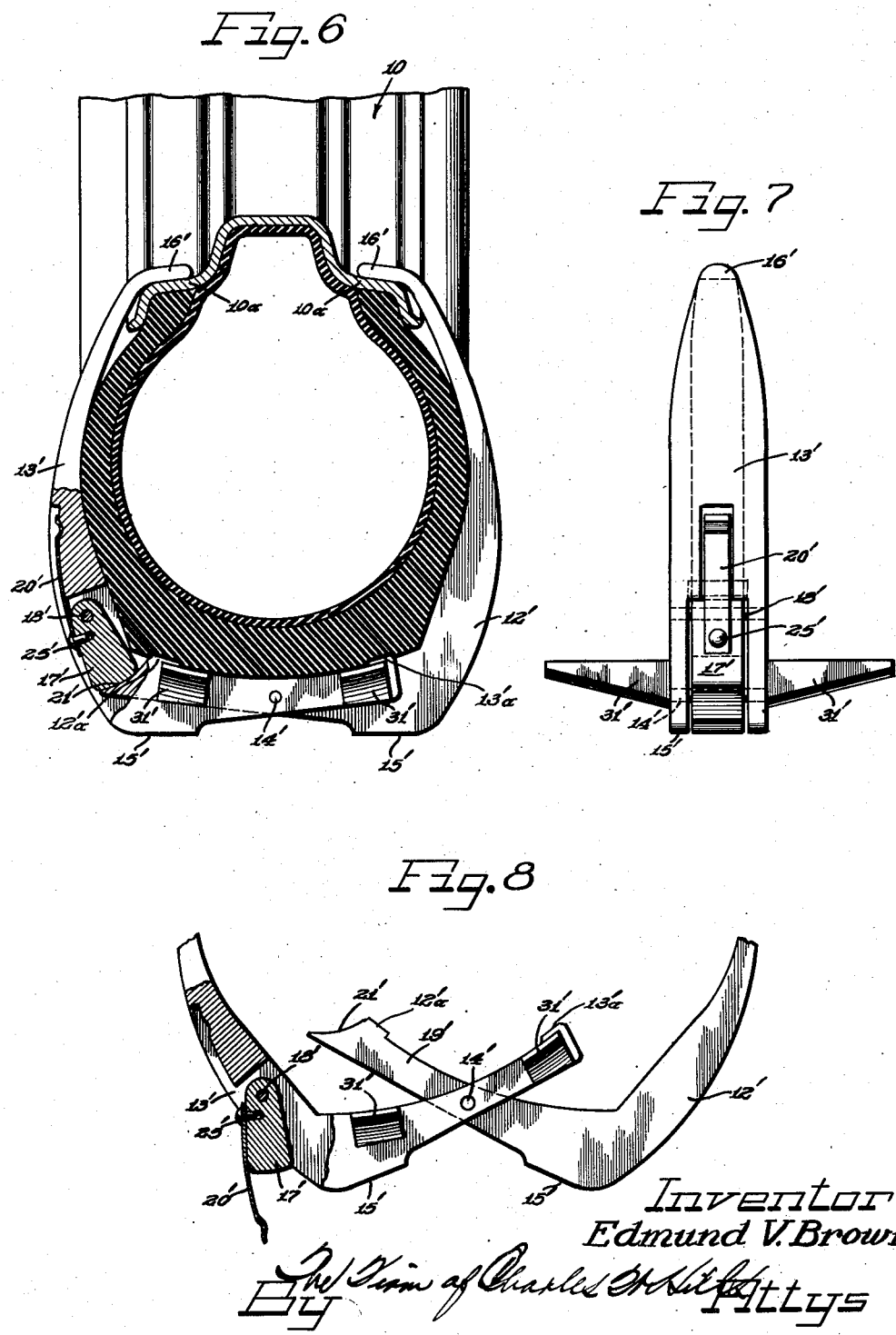
Inventor
Edmund V. Brown Patented Aug. 25, 1953

2,649,885

UNITED STATES PATENT OFFICE 2,649,885

TIRE LUG

Edmund V. Brown, St. Catharines, Ontario, Canada

Application November 16, 1948, Serial No. 60,214

14 Claims. (Cl. 152—228)

This invention relates to a device for increasing the traction of an automobile tire or the like. More specifically, the invention relates to a demountable traction lug which clamps around an automobile tire and onto the rim on which the tire is mounted.

It is an object of this invention to provide a simple, effective, and economical device for increasing the traction of the driving wheel of a vehicle.

Another object of this invention is to provide an automobile tire traction lug in which clamping action is used to secure the lug in place around the tire.

A further object of this invention is to provide a tongs type self-tightening tire lug with releasable self-tightening locking means.

Still another object of this invention is to provide a vehicle traction lug which may be applied to a wheel and locked in place by the operator without using any tools and without reaching behind the tire.

A still further object of this invention is to provide a traction lug for an automobile tire and rim assembly in which the weight of the car is utilized to clamp the lug onto the tire rim.

Other and further objects of the invention will become apparent to those skilled in the art from the following detailed description of the annexed sheets of drawings which disclose preferred embodiments of the invention.

On the drawings:

Figure 1 is a side elevational view of the outer side face of an automobile tire and wheel assembly with the device of this invention affixed thereto;

Figure 2 is an enlarged cross-sectional view with parts in elevation taken along the line II—II of Figure 1 and showing the device of this invention in operating position;

Figure 3 is a front elevational view of the device illustrating the bifurcated ends of the clamp members and locking cam and showing the mounting of the compression spring used to maintain the locking cam in closed position;

Figure 4 is a cross-sectional view similar to Figure 2 but illustrating the manner in which the device is applied to or removel from a tire by manipulation of the locking cam;

Figure 5 is a bottom view of the device in the position illustrated in Figure 4, but with the tire and wheel omitted;

Figure 6 is a cross-sectional view similar to Figure 2 showing a modification of the means whereby the device may be locked on a rim;

Figure 7 is a view similar to Figure 3 showing a modified locking cam in closed position; and Figure 8 is a broken view partially in cross-section showing a position of the modified locking cam prior to applying the device to an automobile tire.

As shown on the drawings:

Figure 1 shows an assembly consisting of a tire 11 and a rimmed wheel 10 on which the device of this invention is mounted. The operation of the device may be more fully understood by reference to Figures 2 to 8 which show the device on a larger scale than in Figure 1.

The lug operates upon the principle of a pincers clamp or tongs. A jaw or pincer 12 is connected to a mating jaw or pincer 13 by means of a pivot pin 14. The jaws 12 and 13 are designed to conform to the transverse contour of a tire and rim assembly as shown particularly in Figures 2, 4 and 6. The jaws 12 and 13 flare outward from the pivot pin 14 to form surfaces or knees 15 overlying the tread of the tire and spaced radially and laterally outward from the pivot pin 14 to be in alignment with the side walls of the tire. The outer faces of the jaws between the support surfaces 15 and the pivot 14 are normally out of load carrying contact with the ground so that the jaws are free to pivot about pin 14. Inturned flanges or hooks 16 are formed on the free ends of the jaws 12 and 13 for engagement with the tire flanges 10a on the rim of the wheel 10.

From Figures 2, 4 and 6 it may be seen that during use of the device the downward force caused by the weight of the tire and vehicle will be centered at the pivot pin 14 of the device. This downward force or weight centered at the pivot pin 14 is borne by the support surfaces 15 on each lateral side of the pivot 14. Since the jaws 12 and 13 are free to pivot about the pivot pin 14, the result is a powerful force tending to close the end flanges 16 on the tire flanges 10a. Since the conventional tire flanges 10a are somewhat inclined the closing force will be partially resolved into a component force pulling the jaws tightly against the tread of the tire to assist in creating a secure anchor.

In view of the fact that the jaw locking forces are applied only intermittently when the weight of the vehicle is pressing downward upon the jaws 12 and 13, it is necessary to provide some means of locking the jaws in operating position in order to prevent the traction lug from flying off when the wheel is rotated. Devices for releasably locking the jaws in operating position and for urging the jaws into tight operating position are disclosed in Figures 2 to 8.

In all of these views the securement of the jaws is maintained by a locking cam or toggle arm 17 mounted upon a pivot pin 18. The operation of the cam illustrated in Figures 2 to 5 is different from the cam illustrated in Figures 6 to 8. In Figures 2 to 5 the jaw 13 is bifurcated from a point part way up the side wall of the tire to the pivot pin 14. The bifurcated end of the jaw 13 may extend beyond the pivot pin 14, but this is not necessary. The jaw 12 nests within the bifurcated end of the jaw 13 and projects beyond the pivot pin 14 approximately to the side wall of the tire. The projecting end of the jaw 12 is bifurcated at the tip thereof and has a pivot pin 22 mounted between the bifurcated ends. A rigid post 23 is fastened to the pivot pin 22. Coiled around the post 23 is a compression spring 20 which impinges upon the pivot pin 22 at one end. The end of the post 23 opposite the pivot pin 22 is in sliding engagement with the locking cam 17. The locking cam 17 is bifurcated in order to allow for a balanced stress on the pivot pins 18 and 22. An apertured strut bar 24 in pivoting engagement with the sides of bifurcated locking cam 17 permits the post 20 to slide therethrough.

Figure 2 shows the lug in operating position and the locking cam closed. The force of the compression spring 20 applied against the apertured bar 24 tends to rotate the locking cam 17 around the pivot pin 18 in a counterclockwise direction (in the view illustrated), tending to move the fall end of the locking cam 17 toward the tire. Thus the compression spring 20 is loaded and maintains the device in tight operating position because it constantly urges the jaws to pivot toward closed position.

To prevent the locking cam 17 from interfering with mounting and unmounting the lug, a groove 33 is provided in the jaw 13 whereby the pivot pin 18 may be disengaged from the jaw 13 when the cam 17 is pivoted to an unlocking position as in Figure 4.

An additional means of maintaining the cam 17 in locking or spring compressing position is best illustrated in Figures 3 and 5, wherein a pin 26 passes through aligned apertures in one of the bifurcated sides of the jaw 13 and in the locking cam 17. The pin 26 is mounted upon a leaf spring 27 which is anchored to the jaw 13 by means of a rivet 28. When the locking cam 17 is in the locking position illustrated in Figure 2 the pin 26 will hold it firmly in place. In order to disengage the locking cam 17 it is only necessary to pull out the pin 26 as illustrated in Figure 5.

In the embodiment illustrated in Figures 6, 7 and 8 the jaw 13' is bifurcated at the pivot and as before. However, the jaw 12', which nests within the bifurcated end of the jaw 13' has an end 21' projecting beyond the pivot pin 14' to the tire side wall. The end 21' is disposed for wedging engagement with the locking cam 17'. The locking cam 17', which is pivotally mounted between the bifurcated end of the jaw 13' on pin 18' has a leaf spring 20' swingably mounted thereon by means of a rivet 25'. When the jaws 12' and 13' are clamped upon a rim in operating position they may be locked by moving the locking cam 17' into wedging engagement with the end 21' illustrated in Figure 6. Projections 12a' and 13a' at the inner ends of jaws 12' and 13', respectively, grip the tire and enable it to press downward against the inside ends of the two jaws. Upward ground reaction forces on knees 15' then serve to clamp the inturned tips 16' upon the wheel rim flanges 10a. Tension in the spring 20' then maintains the locking cam 17' in wedging engagement with the end 21'.

The cam is designed to lock when it is about a quarter-inch from the tire upon being first secured in place. It then has some movement remaining in reserve for further tightening during operation and it can take up distortion caused by springing of the metal.

In order to oppose the tendency of the jaws 12' and 13' to cant away from the perpendicular to the bearing surface of the tire, wing bars or buttress bars 31' are connected to the jaw 13'. These bars also protect the tire from being damaged by the lug.

In the mounting one of the lugs illustrated it is only necessary to place it in open position around the tire tread and move the locking cam into locking position. When the weight of the vehicle presses on the lug the spring will tend to make the locking cam move inward to take up and maintain any tightening of the arms.

In removing the lug it is only necessary to unlock the cam and tap the lug with a stone or any hard object so that the cam can spring out of position. The lug will then be free for removal.

It will, of course, be understood that various details of the invention may be varied through a wide range without departing from the principles of this invention, and it is, therefore, not the purpose to limit the patent granted hereon otherwise than necessitated by the scope of the appended claims.

I claim as my invention.

1. A traction lug adapted for use on a tire and rim assembly which comprises a metal clamp member with jaws adapted to span the tread and side walls of the tire and to clamp onto the rim, the jaws of said clamp member being connected by a pivot pin located on the tread spanning portion of said jaws, said jaws being flared outward from the pivot pin to provide support surfaces whereby force applied on said surfaces in reaction to weight applied against said pivot pin will cause said jaws to close, means for locking said jaws after the application of force has brought them into grasping engagement with the rim, said locking means consisting of a cam pivoted on the side wall portion of one of said jaw members and disposed for wedging engagement with a portion of the other of said jaw members extending beyond the clamp pivot, and means for positively urging said cam in wedging engagement with said portion.

2. A traction lug adapted for use on a tire and rim assembly which comprises a metal clamp member with jaws adapted to span the tread and side walls of the tire and to clamp onto the rim, the jaws of said clamp member being pivotally connected at a point located on the tread spanning portion thereof, said jaws being disposed to grasp said rim upon being squeezed between the tire and the foundation upon which it rests, means for locking said jaws in place when said lug is in operating position, said locking means consisting of a cam pivoted on the side wall portion of one of said jaw members and disposed for wedging engagement with a portion of the other of said jaw members extending beyond the clamp pivot, and resilient means for urging said cam in wedging engagement with said portion.

3. A clamp for increasing the traction of a tire mounted on a rim, said clamp comprising a pair of jaw members adapted to conform to the transverse outside contour of said tire and to impinge upon the rim on which said tire is mounted, said jaws being pivotally connected at a point on the tire spanning portion thereof, said jaws being flared outward from the pivot pin and away from the jaw tips whereby a force applied on said jaws toward said tips from their flared portions and away from said tips at the pivot pin will cause said jaws to close, means for locking said jaws after the application of force has brought them to the desired degree of closure, said locking means consisting of a cam pivoted on the side wall portion of one of said jaw members and disposed for wedging engagement with a portion of the other of said jaw members extending beyond the clamp pivot, and means positively urging said cam in wedging engagement with said portion.

4. A traction lug adapted for use on a pneumatic tire and rim assembly which comprises a metal clamp member with jaws adapted to span the tread and side walls of the tire and to clamp onto the rim, the jaws of said clamp member being pivotally connected at a point on the tread spanning portion thereof, said jaws being flared outward from the pivot pin and away from the jaw tips whereby force applied on said jaws toward said tips from the flared portions and away from said tips at the pivot pin will cause said jaws to close, means for locking said jaws after the application of force has brought them into grasping engagement with the rim, said locking means consisting of a locking cam pivoted on the sidewall portion of one of said jaw members and disposed for wedging engagement with a portion of the other of said jaw members extending beyond the clamp pivot, and a leaf spring pivoted on said locking cam and swingable into impinging engagement with the jaw member from which said locking cam is pivoted whereby the said cam is held in wedging engagement with the said portion of said jaw member.

5. A traction lug adapted for use on a tire and rim assembly which comprises a metal clamp member with jaws adapted to span the tread and side walls of the tire and to clamp onto the rim, the jaws of said clamp member being pivotally connected at a point on the tread spanning portion thereof, said jaws being disposed to grasp said rim upon being squeezed between the tire and the foundation upon which it rests, means for locking said jaws in place when said lug is in operating position, said locking means consisting of a locking cam pivoted on the side wall portion of one of said jaw members and disposed for wedging engagement with a portion of the other of said jaw members extending beyond the clamp pivot, and a leaf spring pivoted on said locking cam and swingable into impinging engagement with the jaw member from which said locking cam is pivoted whereby the said cam is held in wedging engagement with the said portion of said jaw member.

6. A traction lug adapted for use on a tire and rim assembly which comprises a metal clamp member with jaws adapted to span the tread and side walls of the tire and to clamp onto the rim, the jaws of said clamp member being pivotally connected at a point on the tread-spanning portion thereof, said jaws being flared outward from the pivot pin and away from the tips whereby force applied on said jaws toward said tips from the flared portions and away from said tips at the pivot pin will cause said jaws to close, one of said jaws being bifurcated at the pivot end and the other of said jaws projecting between said bifurcated ends and beyond the clamp pivot pin approximately to the side wall of said tire, a locking cam pivoted within said bifurcated end and disposed to engage the projecting end of the other of said jaws, and a swingable leaf spring pivoted on said locking cam for maintaining said cam in engagement with said projecting end.

7. A traction lug adapted for use on a tire and rim assembly which comprises a metal clamp member with jaws adapted to engage the tread and side walls of the tire and having tips to clamp onto the rim, the jaws of said clamp member being pivotally connected at a point on the tire-engaging portion thereof, said jaws being flared outward from the pivot pin and away from the jaw tips whereby opposite forces applied at the flared portions and at the pivot point will cause said jaws to close, both of said jaws being bifurcated at the pivot end with the smaller nesting within the larger, the smaller bifurcated end projecting beyond the clamp pivot pin and having a compression coil spring pivotally connected to the end thereof, a bifurcated locking cam pivoted in the larger bifurcated end and pivotally connected to the end of said compression spring opposite the jaw connection, the bifurcated ends of said locking cam being disposed to engage said smaller bifurcated jaw and maintain it in place when said jaw is clamped onto a tire and rim assembly, the said compression spring cooperating with the locking cam to maintain it resiliently in engagement with said smaller bifurcated end.

8. A traction lug adapted for use on a pneumatic tire and rim assembly which comprises a metal clamp member with jaws adapted to span the tread and side walls of the tire and to clamp onto the rim, the jaws of said clamp member being pivotally connected at a point on the tread spanning portion thereof, said jaws being disposed to grasp said rim upon being squeezed between the tire and the foundation upon which it rests, means for locking said jaws in place when said lug is in operating position, said locking means consisting of a locking cam pivoted on the side wall portion of one of said jaw members and disposed for engagement with a portion of the other of said jaw members projecting beyond the clamp pivot, and means urged by the resilient side walls of said pneumatic tire acting to maintain said cam in locking position.

9. A traction lug adapted for use on a pneumatic tire and rim assembly which comprises a metal clamp member with jaws adapted to span the tread and side walls of the tire and to clamp onto the rim, the jaws of said clamp member being pivotally connected at a point on the tread spanning portion thereof, said jaws being flared outward from the pivot point and away from the jaw tips whereby force applied on said jaws from the flared portion in a direction toward said tips and from the pivot point in a direction away from said tips will cause said jaws to close, means for locking said jaws after the application of force has closed them into grasping engagement with the rim, and said locking means consisting of a locking cam pivoted on the side wall portion of one of said jaw members and disposed for wedging engagement with a portion of the other of said jaw members extending beyond the clamp pivot.

10. A traction lug adapted for use on a tire and rim assembly which comprises a metal clamp member with jaws adapted to span the tread and side walls of the tire and to clamp onto the rim, the jaws of said clamp member being pivotally connected at a point on the tread spanning portion thereof, said jaws being flared outward from the pivot pin and away from the tips whereby force applied on said jaws toward said tips from the flared portion and away from said tips at the pivot connection will cause said jaws to close, one of said jaws being bifurcated at the pivot end and the other of said jaws projecting between said bifurcated end and beyond the clamp pivot pin approximately to the side wall of said tire, a locking cam pivoted within said bifurcated end and disposed to engage the projecting end of the other of said jaws, and said locking cam having an extension beyond its pivot adapted to be forced outwardly to urge the cam into wedging engagement with the projecting end of said other jaw.

11. A traction lug for attachment to a vehicle tire, which comprises jaws, each having a portion conforming to the tire side wall, a tire-tread engaging portion and a knee, said tread portion being relieved inwardly from said knee, pivot means joining said tread portions, whereby in clamped position said jaws will be tightened upon said tire by downward force upon said tread portions and upward reactions upon said knees, and resilient means for locking said jaws in clamped position, said locking means including a toggle arm pivoted on the side wall portion of one of said jaws, and a compression spring carried off-center by said toggle arm and resiliently engaging the tread portion of an opposing jaw.

12. A traction lug for attachment to a vehicle tire, which comprises jaws, each having a portion conforming to the tire side wall, a tire tread engaging portion and a knee, said tread portion being relieved inwardly from said knee, pivot means joining said tread portions, whereby in clamped position said jaws will be tightened upon said tire by downward force upon said tread portions and upward reactions upon said knees, and resilient locking means urging said jaws into tightly clamped position.

13. A traction lug for a vehicle tire, which comprises jaws curved to conform snugly to the transverse contour of a vehicle tire, each of said jaws having a side-wall portion, a tread engaging portion, and a ground-engaging knee portion, said tread portion being relieved inwardly from said knee portion and having a free terminus remote from said knee portion, pivot means joining said tread portions between their knee portions and corresponding termini, whereby in clamped position outwardly directed forces will be born by said tread portions and inwardly directed reactions will be applied at said knee portions, and releasable locking means resiliently acting upon said jaws to urge the same into tightly clamped position.

14. A traction lug for disposal around a vehicle tire, which comprises jaws, each having a portion conforming to the tire side wall, a tire tread engaging portion and a knee, said tread portion being relieved inwardly from said knee, pivot means joining said tread portions, whereby in clamped position said jaws will be tightened upon said tire by downward force upon said tread portions and upward reactions upon said knees, and locking means pivoted on one of said jaws for acting against the other of said jaws to hold the jaws in locked relation around the vehicle tire.

EDMUND V. BROWN.

References Cited in the file of this patent

UNITED STATES PATENTS

| Number | Name | Date |
| --- | --- | --- |
| 1,499,036 | Smith | June 24, 1924 |
| 1,941,935 | Erickson | Jan. 2, 1934 |
| 2,445,947 | Hoppes | July 27, 1948 |
| 2,518,170 | Otis | Aug. 8, 1950 |
| 2,525,367 | Miller | Oct. 10, 1950 |